United States Patent [19]

Fussangel

[11] 4,151,784
[45] May 1, 1979

[54] SHOCK ABSORBER

[76] Inventor: Hubert Fussangel, Am Hoverkamp 52, Kaarst, Fed. Rep. of Germany

[21] Appl. No.: 832,815

[22] Filed: Sep. 13, 1977

Related U.S. Application Data

[63] Continuation-in-part of Ser. No. 568,390, Apr. 16, 1975, Pat. No. 4,056,040.

[30] Foreign Application Priority Data

Apr. 20, 1974 [DE] Fed. Rep. of Germany ....... 2419118
Feb. 15, 1975 [DE] Fed. Rep. of Germany ....... 2506451

[51] Int. Cl.² ............................................. F15B 15/22
[52] U.S. Cl. .......................................... 91/25; 91/31; 91/408; 188/285; 188/287
[58] Field of Search ................. 91/408, 407, 405, 409, 91/25, 31; 92/85 B; 188/285, 287

[56] References Cited

U.S. PATENT DOCUMENTS

| | | | |
|---|---|---|---|
| 2,292,336 | 8/1942 | Farnhom | 91/408 |
| 2,443,312 | 6/1948 | Gerger et al. | 91/407 |
| 3,043,277 | 7/1962 | Carlson | 91/408 |
| 3,138,066 | 6/1964 | Walker | 91/408 |
| 3,344,894 | 10/1967 | Kenworthy | 188/287 |
| 3,731,770 | 5/1973 | Bindon | 188/287 |
| 4,056,040 | 11/1977 | Fussangel | 91/408 |

*Primary Examiner*—Paul E. Maslousky
*Attorney, Agent, or Firm*—Toren, McGeady and Stanger

[57] ABSTRACT

A shock absorber of the kind having an infinitely adjustable damping characteristic comprises a main cylinder containing a piston fixed to a piston rod which extends from the main cylinder and liquid within the cylinder acting on the piston. The main cylinder has openings for the flow from it of the liquid upon movement of the piston in the cylinder and an adjustment device is provided for restricting these openings to provide the adjustment of the damping characteristic. The openings are situated in the peripheral wall of the main cylinder and are axially spaced apart from each other in positions in which they are successively passed over and closed by the piston as the piston approaches the end of its stroke at one end of the main cylinder in a damping movement. Thus the flow of liquid from the main cylinder is progressively further throttled by closure of the openings as the piston approaches the end of its movement. The adjustment device includes an outer cylinder rotatably mounted relative to the main cylinder and at least one arcuate adjustment element consisting of a crescent-shaped section having a surface extending eccentrically relative to the main cylinder and extending over the openings to adjustably vary the flow path through the openings upon rotation of the outer cylinder.

5 Claims, 9 Drawing Figures

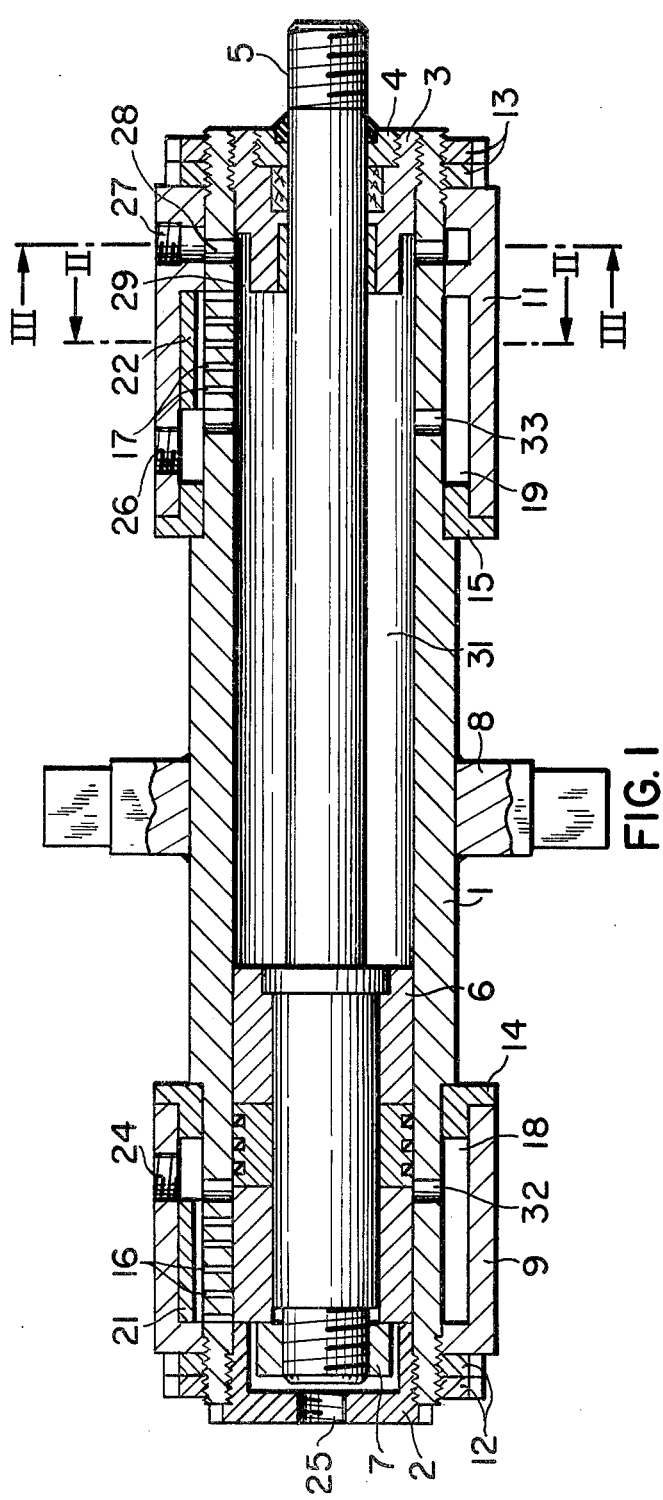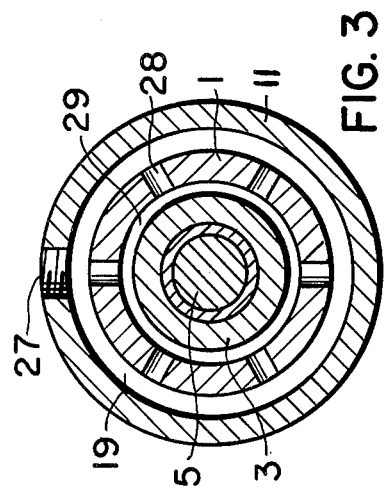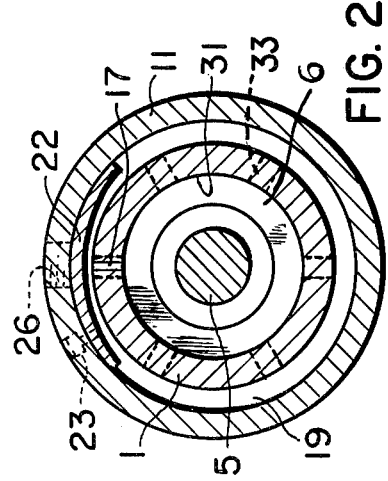

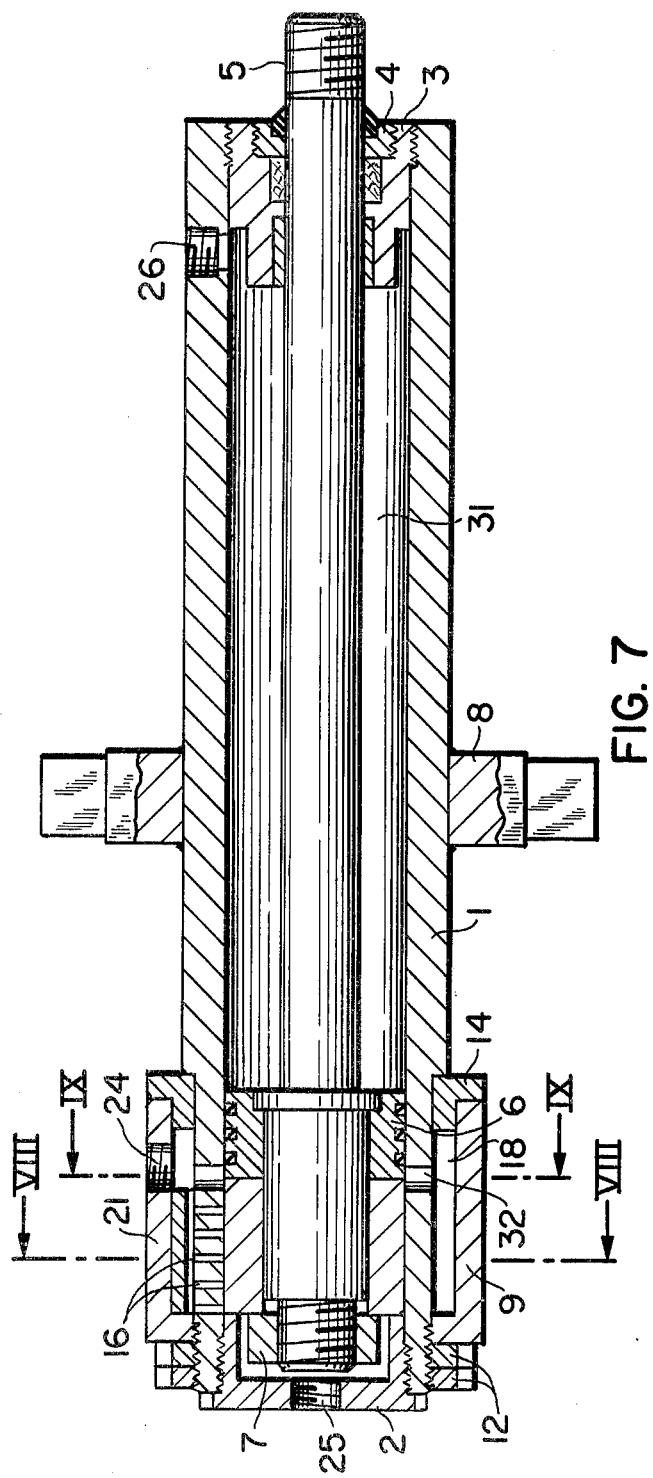

SHOCK ABSORBER

CROSS REFERENCE TO RELATE APPLICATIONS

This application is a Continuation-In-Part of copending application Ser. No. 568,390 filed Apr. 16, 1975, now U.S. Pat. No. 4,056,040.

This invention relates to shock absorbers which have infinitely adjustable damping characteristics and which are intended for example for industrial purposes. The shock absorbers comprise a cylinder containing a piston fixed to a piston rod and liquid acting on the piston, the cylinder having openings for the flow from it of the liquid upon movement of the piston and means for restricting the openings to provide the adjustment of the damping characteristic.

Such infinitely adjustable shock absorbers of this class are used in many fields of industry, for example in order to decelerate accelerated masses or to absorb shocks caused by the accelerated masses. Typical applications for such shock absorbers are for example found in rolling mill and foundry machinery and equipment, conveying and lifting equipment, stamping machines, machine tools and construction machinery or the like, and also in heavy vehicles. The shock absorbers are predominantly used wherever there is a need for accepting large loads at high speeds, in order to convert the resulting impact forces into smaller forces of longer duration and transmit the smaller forces to a machine body, foundation or the like.

In industry and in vehicle construction furthermore, power cylinders operated by hydraulic liquid under pressure are used. Typical applications for such power cylinders are, for instance, in control and lifting jacks, and for raising, lowering or in other ways moving machine or vehicle components.

The aim of the present invention is to provide a shock absorber having an infinitely adjustable damping characteristic and comprising a cylinder containing a piston fixed to a piston rod and liquid acting on the piston, the cylinder having openings for the flow from it of the liquid upon movement of the piston and means for restricting the openings to provide the adjustment of the damping characteristic, which is especially suitable for industrial application, which can be made in a space-saving manner and is of robust construction, which can be easily adjusted and which can also be adapted to provide it with a power cylinder capability.

According to this invention, in such a shock absorber, the openings are provided in the peripheral wall of the cylinder and are axially spaced apart from each other in positions in which they are successively passed over and closed by the piston as it approaches the end of its stroke at one end and/or the other end of the cylinder.

The cylinder may be provided with an inlet for liquid under pressure to provide a single-acting power capability and the shock absorbing effect is either single-acting or double-acting.

By appropriate selection and combination of various shock absorber features and power cylinder features devices suitable for many different applications may be made and with these devices it is possible not only to control and drive machine and vehicle components in an optimum manner, but also to accelerate and/or decelerate them in a pre-determined manner. Shock absorbers in accordance with the invention may thus be made with a two-fold function, namely a power function and an accelerating and damping function. By the infinite adjustment of the damping characteristic of the shock absorber it is possible to obtain a linearly accelerating and decelerating movement of the working piston. The shock absorber can be adjusted to an optimum characteristic for each purpose, so that the resultant stressing of machine or vehicle components or other members to be moved can be kept within pre-determined values.

The linear movement control makes possible both a gentle transference of the mass in movement and the achievement of a uniform counter-pressure during the deceleration phase, and also a gentle transference of the arrested mass onto a fixed abutment. This contributes considerably to the preservation and increase in working life of machines and other devices, and also makes possible a considerable increase in the speed of movement for given stress values. The shock absorber can also produce a considerable shortening of the time required for deceleration and thus a reduction of standstill time, loss of production and repair costs.

By appropriate directing of the pressurized liquid the shock absorber can be made single-acting or double-acting and may function solely as a shock absorber without a power function.

In order to adapt the shock absorber to requirements, the axial spacing of the openings in the peripheral wall of the cylinder becomes progressively smaller towards one or both ends of the cylinder. This makes a low initial loading of the piston possible and subsequent increasing acceleration by adjustment of the other openings to larger cross-sections. At the end of the accelerating movement, the full liquid pressure can be applied to the effective piston area. Within an operating stroke, the shock absorber can be made to operate as a normal power cylinder. At the end of the operating stroke, a desired gentle deceleration can then be ensured by progressive adjustment to decreasing cross-sections of the openings in the peripheral wall of the cylinder.

In order to obtain a desired linear acceleration and deceleration by varying the restriction of the openings, the restricting means may comprise an adjustment element movably mounted adjacent the outer ends of the openings.

In parent application Ser. No. 568,390 there is described and claimed an arrangement wherein the adjusting element comprises diametrically opposed crescent-shaped segments. By this form of construction a very sensitive control and thus regulation of the shock-absorbing characteristic is possible over a wide range. The adjusting segments in the arrangement described and claimed in the parent application may be mounted on the inner face of an outer cylinder part which surrounds and is rotatably mounted on the cylinder. To adjust the damping characteristic it is then only necessary for the outer cylinder part together with the adjusting segments, to be rotated.

The present invention is basically identical with that described in parent application Ser. No. 568,390 except that only one crescent-shaped section may be satisfactorily utilized instead of the plurality of sections used in the arrangement of the parent application. Thus, the disclosure of application Ser. No. 568,390 is incorporated herein by reference with the applicable differences being noted herein.

The various features of novelty which characterize the invention are pointed out with particularity in the claims annexed to and forming a part of this disclosure.

For a better understanding of the invention, its operating advantages and specific objects attained by its use, reference should be had to the accompanying drawings and descriptive matter in which there are illustrated and described preferred embodiments of the invention.

In the drawings:

FIG. 1 is an axial section through a first example comprising a double-acting power cylinder which also constitutes a double-acting shock absorber and which utilizes only a single crescent-shaped section at each end;

FIG. 2 is a cross-section taken along the line II—II of FIG. 1;

FIG. 3 is a cross-section taken along the line III—III of FIG. 1;

FIG. 7 is an axial section through a third example again comprising a power cylinder incorporating a shock absorber at one end utilizing a single crescent-shaped section;

FIG. 8 is a cross-section on the line VIII—VIII of FIG. 7; and

FIG. 9 is a cross-section on the line IX—IX of FIG. 7.

Figure 4:
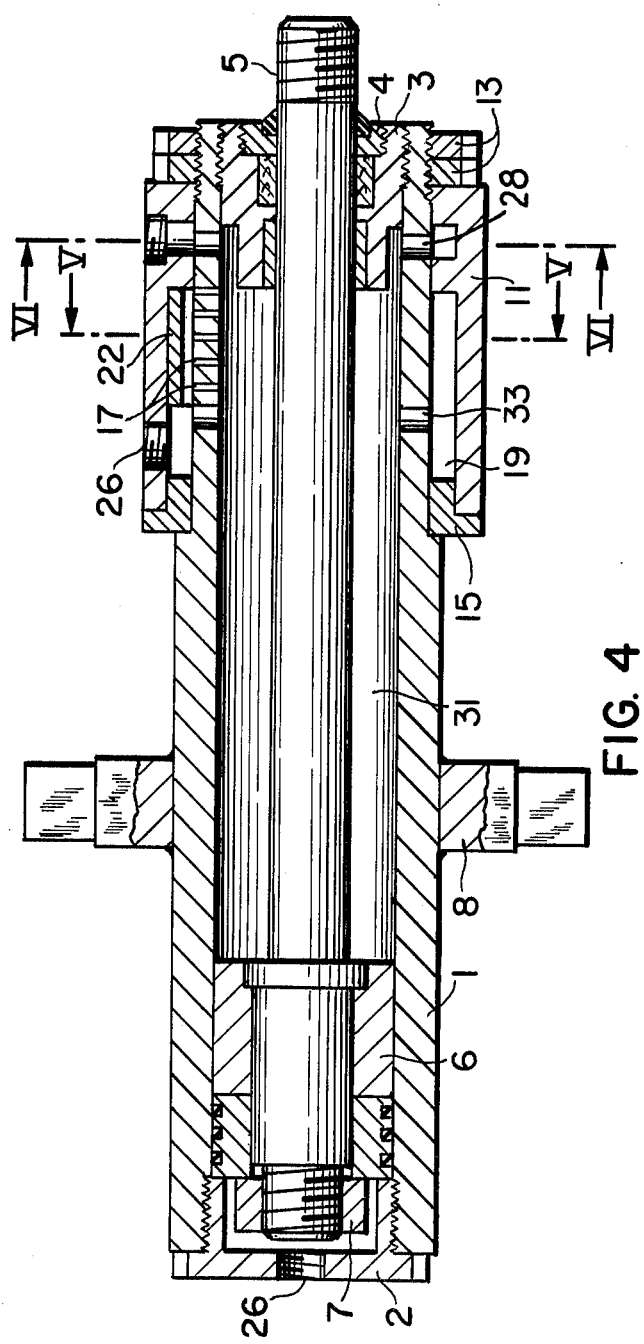
FIG. 4 is an axial section through a second example comprising a power cylinder which has a piston rod and the piston rod end of which constitutes a shock absorber and which, again, utilizes a single crescent-shaped section.

In the first example shown in FIGS. 1 to 3, a double-acting power cylinder 1 has screwed into it at one end a cylinder head 2, and at the other end a guide head 3. The guide head 3 is secured axially by a securing disc 4. A piston rod 5 is slidable in the guide head 3 and a piston 6 is axially slidable in the cylinder 1. The piston rod 5 is fixed at its inner end by a nut 7 to the piston 6. A mounting element, which in this example is in the form of radially projecting trunnions 8, is provided on the cylinder 1 near its middle.

The end portions of the cylinder 1 are surrounded with a clearance, by outer cylinder parts 9 and 11, which are secured by retaining nuts 12 and 13 against axial movement. At their outer ends, the outer cylinder parts 9 and 11 are rotatably mounted directly upon the cylinder 1, and at their inward ends are mounted on the cylinder through the intermediary of bearing rings 14 and 15. In parts of those portions of the cylinder 1 which are covered by the outer cylinder parts 9 and 11, there are a number of openings in the form of radial passages 16 and 17, disposed at axial spacings one from another. In the vicinity of the passages 16 and 17 are adjustment segments 21 and 22 which extend in annular spaces 18 and 19 between the outer cylinder parts 9 and 11 and the cylinder 1. The adjustment segments 21, 22 are substantially sickle-shaped or crescent-shaped in cross-section and are disposed both in the retracted and in the extended range of the piston 6 in the cylinder 1. They are situated on opposite ends of the cylinder 1 and are fixed by screws 23 to the outer cylinder parts 9 and 11. In FIG. 2, there is shown the arrangement whereby the single crescent-shaped section 22 is mounted within the outer cylinder part 9. By appropriate rotation of the outer cylinder parts 9, 11 and consequently of the adjustment segments 21, 22, the radial distances between the inner faces of the adjustment segments and the radial passages 16 and 17 can be varied, thus enabling the desired shock absorber damping characteristic to be adjusted.

In the outer cylinder part 9 there is a hydraulic liquid inlet opening 24, which is in communication with the annular space 18.

At the piston rod end of the cylinder there is a discharge opening 26 in the outer cylinder part 11. The discharge opening 26 is in communication with the annular space 19.

In the outer cylinder part 11 there is a further hydraulic liquid feed opening 27, which also has a non-return valve. The feed opening 27 is in communication, via a radial duct 28 in the working cylinder 1, with an axial duct 29 in the guide head 3. The axial duct 29 leads into a pressure chamber 31 of the cylinder 1.

As can be seen from FIG. 1, the mutual axial spacings of the radial passages 16 and 17 become progressively smaller towards the ends of the cylinder 1. This enables a desired deceleration and acceleration of the piston 6 to be achieved. At the inward ends of the passages 16, 17 further passages 32, 33 of larger diameter extend and the purpose of these further passages will also be explained later.

The mode of operation of the shock absorber illustrated in FIGS. 1 to 3 is as follows:

To start with the shock absorber is situated in the retracted position illustrated in FIG. 1, in which the piston 6 is at the left-hand end of the cylinder 1. In this retracted position, all the radial passages 16 and also the larger diameter passages 32 are closed by the piston 6. Thus liquid under pressure which is introduced through the inlet opening 24 into the annular chamber 18 can flow through the gap between the adjusting segment 21 and the cylinder 1 and thence into the radial passages 16. Here, the path of the pressurized liquid is initially terminated, since all the passages 16, as already mentioned, are closed by the piston 6. In order to obtain a starting movement of the piston 6, pressurized liquid acts, via the feed opening 25 and the inlet opening 24, upon the piston 6. This causes the piston 6 to move a small distance towards the right. Pressurized liquid then immediately flows into the space behind the left-hand face of the piston 6 through those radial passages 16 which are situated furthest to the left, so that this piston is moved faster towards the right. Further pressurized liquid then flows in the same way through each of the radial passages 16, as they are uncovered, so that the piston rod 5 is extended with increasing speed as a consequence of the increasing flow of pressurized liquid. The openings 32 of larger diameter have the function, after the piston 6 has moved through a pre-determined distance, of applying the full liquid flow to the piston without any throttling effect.

As a result of the arrangement of the passages 16, and in dependence on the particular adjusted position of the adjusting segments 21 in relation to the passages 16, the piston 6 and with it the piston rod 5 are progressively subjected to the flow of liquid under pressure in the desired manner.

During the extending movement of the shock absorber, the fluid expelled from the chamber 31 is conducted through the radial passages 17 and 33 and the annular chamber 19, into the discharge opening 26 and thence to a reservoir. As already mentioned, the feed opening 27 is fitted with a non-return valve, which is disposed outside the shock absorber and prevents an outward flow of the pressurized liquid.

As the right-hand edge of the piston 6 approaches the extended position of the shock absorber, the radial passages 17 are successively passed over by the piston 6, so that a progressive throttling effect is produced. The deceleration thus produced can be regulated by suitable adjustment of the adjustment segment 22 provided at this end of the cylinder. It is thus possible to regulate both the acceleration and also the deceleration of the shock absorber in a linear manner.

Since the shock absorber also forms a double-acting power cylinder, the piston rod 5 can also be moved under power from its extended position into the retracted position. This is achieved initially by introducing liquid under pressure through the feed opening 27, whereby the liquid acts, via the radial duct 28 and the axial duct 29, upon the face at the piston rod end of the piston 6, so that the piston is moved by pressure away from its extended position.

As soon as the piston 6 has travelled a short distance, additional liquid arrives, via the discharge opening 26, the annular chamber 19, along the adjusting segment 22 and the passages 17, at the piston rod end face of the piston 6. Since, during this initial movement, further radial passages 17 are successively exposed, the piston is again moved with increasing acceleration into the retracted position of the shock absorber and it is again decelerated by the radial passages 16 situated at the left-hand side of the cylinder in conjunction with the adjusting segment 21. The opening 25 is at this time closed outside the shock absorber by the non-return valve, already mentioned, to prevent the outward flow of liquid.

In this example a shock absorber constructed as a driving cylinder is obtained, which makes possible both a linear deceleration and also linear acceleration and thereby ensures a progressive control.

As a variant of the above-described example, the double-acting shock absorber can incorporate only a single-acting power cylinder. The shock absorber then operates as a pushing or pulling power cylinder, depending upon whether the piston end face or piston rod end face of the piston 6 is subjected to pressurized liquid. If, for example, the piston rod end face is subjected to pressure, then the liquid on the other side of the piston flows out against no back pressure through the passages 16, the annular space 19 and the inlet opening 24 into a reservoir. As soon as the piston 6 has passed over the passages 16, an increasing back-pressure builds up in the decelerating movement of the piston and this pressure dies away again after the deceleration has been completed.

With a single-acting power cylinder 1, it is a presumption that the return stroke of the piston into its starting position is effected by external means, for example a spring or compressed air, or by connection to a machine of which the shock absorber forms part.

The above-described controlling of the shock absorber can also be effected inversely, by pressuring the piston end face with pressurized liquid and by using the piston rod end face of the piston, after the working range extending as far as the passages 17 has been passed, for the purpose of damping. In this case, the pressurized liquid flows out into a reservoir through the passages 17, the annular space 19 and through the opening 26. During any impact damping, the opening 27 is closed by its non-return valve.

The shock absorber illustrated in FIGS. 1 to 3 can also be used without any power capability, that is solely as a shock absorber, by supplying no pressurized liquid. In this case, both the chambers at the piston end face and also the piston rod end face of the piston are in communication with each other through appropriate ducting and at a slight pressure with a tank, and both faces of the piston are substantially unpressurized. The non-return valves already mentioned are associated with the two openings 25 and 27 and these valves make possible the forced circulation necessary for cooling the hydraulic liquid and permit the piston to be moved from each of the end positions without throttling.

Figure 6:
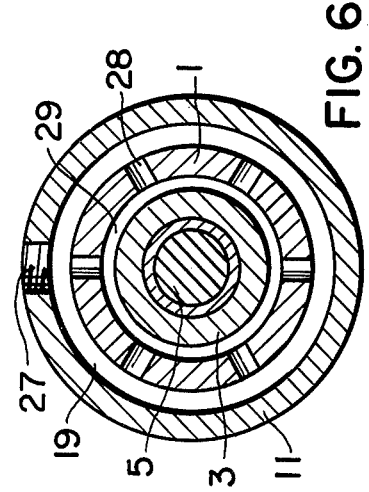
FIG. 6 is a cross-section on the line VI—VI of FIG. 4.
Figure 5:
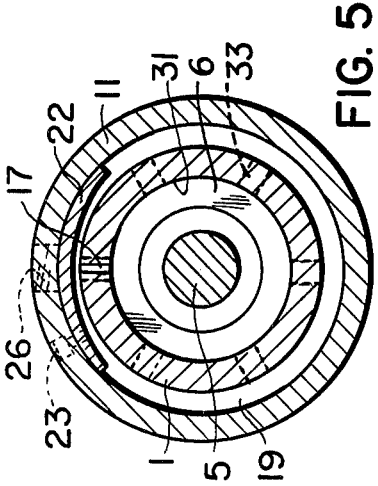
FIG. 5 is a cross-section on the line V—V of FIG. 4.

The example shown in FIGS. 4 to 6 is generally similar to the example shown in FIGS. 1 to 3, but with the difference that the damping passages are not situated at both ends of the cylinder, but only at the piston rod end. This shock absorber with damping only at the piston rod end may act as either a double-acting power cylinder, as a single-acting power cylinder acting in either direction, or solely as a shock absorber with no power capability. The hydraulic system for the case last described is illustrated with reference to FIG. 17 of parent application Ser. No. 568,390.

It will be noted that in the arrangement depicted in FIGS. 4–6 only a single adjusting segment 22 consisting of a crescent-shaped segment is shown and the device will operate in accordance with the basic principles of the invention in a satisfactory manner.

Another example of a shock absorber constructed in a similar manner to the example shown in FIGS. 4 to 6 is shown in FIGS. 7 to 9. In the arrangement of FIGS. 7 to 9 only a single crescent-shaped section 21 is utilized.

Here again, two such shock absorbers may for example be disposed one on each side of a transport device and have their piston rod ends directed towards the transport device. In constrast to the example of FIGS. 4 to 6 however, in this case the shock absorber end is disposed at that end of the cylinder which is remote from the transport device. If, for instance, the cylinder of the shock absorber on the right-hand side of the transport device is pressurized with the liquid so that it pulls the transport device towards the right, then towards the end of its power stroke, its piston moves into the decelerating range so that the movement is retarded or damped.

The actuation of the shock absorber on the left-hand side of the transport device is carried out in a similar manner. Again as the piston approaches the end of its stroke, it is retarded.

While specific embodiments of the invention have been shown and described in detail to illustrate the application of the inventive principles. it will be understood that the invention may be embodied otherwise without departing from such principles.

What is claimed is:

1. A shock absorber assembly having variable damping characteristics comprising: main cylinder means defined by peripheral wall means; piston means axially slidably mounted within said main cylinder means and movable relative thereto under the influence of pressure fluid within said main cylinder means; flow means for effecting pressure fluid flow to and from said main cylinder means to control relative movement between said piston means and said main cylinder means; said flow means including means defining openings in said peripheral wall in flow communication with said main cylinder means, said openings being axially spaced apart from each other along said peripheral wall in positions in which said openings are successively passed over to be closed and opened by said piston means during movement thereof relative to said main cylinder means; and adjustment means for varying fluid flow through said openings to provide adjustment of said damping characteristics of said shock absorber assembly, said adjustment means comprising outer cylindrical means rotatably mounted relative to said main cylinder means and spaced radially therefrom, and at least one arcuate adjustment element comprising a substantially crescent-shaped section mounted upon said outer cylinder means for rotation therewith relative to said main cylinder means, said crescent-shaped section having surface means extending eccentrically relative to said main cylinder means and over said openings to adjustably vary the flow path through said openings upon rotation of said outer cylindrical means relative to said main cylinder means.

2. A shock absorber according to claim 1 wherein said main cylinder means further comprises means defining an inlet for liquid under pressure to act upon said piston means to provide said shock absorber with a single-acting power capability.

3. A shock absorber according to claim 1 wherein said main cylinder means further comprises means defining inlets for liquid under pressure at both ends of said main cylinder means for said liquid to act upon said piston means from one end or the other end of said main cylinder means thereby providing said shock absorber with a double-acting power capability.

4. A shock absorber according to claim 1 wherein said axial spacing of said openings in said peripheral wall means becomes progressively smaller toward one end of said main cylinder means.

5. A shock absorber according to claim 1 wherein said outer cylindrical means comprise two outer cylindrical parts surrounding said main cylinder means, one outer cylindrical part being adjacent each of the ends of said main cylinder means and means rotatably mounting said two outer cylindrical parts on said main cylinder means for rotation independently of each other, there being provided one crescent-shaped section acting as said arcuate adjustment element with each of said outer cylindrical parts.

* * * * *